United States Patent [19]

Jönsson et al.

[11] 4,238,041

[45] * Dec. 9, 1980

[54] GLASS CONTAINER WITH A FIXED PLASTIC PROTECTIVE LAYER

[76] Inventors: Bo R. Jönsson, Skyrsta 42, 690 43 Hammar; Gunnar G. Toll, Åsbacken 7; Bo T. K. Bodelind, Skräddargränd 20, both of 445 00 Bohus, all of Sweden

[*] Notice: The portion of the term of this patent subsequent to Apr. 22, 1992, has been disclaimed.

[21] Appl. No.: 422,838

[22] Filed: Dec. 7, 1973

Related U.S. Application Data

[63] Continuation-in-part of Ser. No. 261,970, Jun. 12, 1972, abandoned, which is a continuation of Ser. No. 41,623, May 28, 1970, abandoned.

[51] Int. Cl.$^3$ .................. B05D 1/36; B05D 3/02; B32B 17/06; C03C 17/00
[52] U.S. Cl. .................. 215/12 R; 215/DIG. 6; 65/60 A; 65/60 B
[58] Field of Search .................. 117/18, 21, 72, 94, 117/124 B, 124 E; 215/1 R, 12 R, DIG. 6; 65/30, 60 A, 60 B

[56] References Cited

U.S. PATENT DOCUMENTS

| | | | |
|---|---|---|---|
| 3,084,824 | 4/1963 | Kuzma et al. | 215/DIG. 6 |
| 3,352,707 | 11/1967 | Pickard | 117/94 |
| 3,415,673 | 12/1968 | Clock | 117/72 |
| 3,420,693 | 1/1969 | Scholes et al. | 117/72 |
| 3,451,795 | 6/1969 | Budd | 65/30 |
| 3,480,464 | 11/1969 | Lacy | 117/71 R |
| 3,490,885 | 1/1970 | Hammer | 65/30 |
| 3,498,773 | 3/1970 | Grubb | 65/30 |
| 3,507,680 | 4/1970 | Kiel | 117/72 |
| 3,522,075 | 7/1970 | Kiel | 117/72 |
| 3,554,787 | 1/1971 | Plymale | 117/124 E |
| 3,805,985 | 4/1974 | Hagiwara et al. | 117/124 E |
| 3,823,032 | 7/1974 | Ukai | 117/72 |
| 3,825,142 | 7/1974 | Campagna | 215/DIG. 6 |
| 3,836,386 | 9/1974 | Roy | 117/94 |
| 3,864,152 | 2/1975 | Kitamura et al. | 117/72 |
| 3,878,960 | 4/1975 | Jönsson et al. | 215/12 R |
| 3,920,869 | 11/1975 | Eckell | 65/60A |

OTHER PUBLICATIONS

Websters New World Dictionary of the American Language, p. 59, The World Publishing Company.

*Primary Examiner*—Sam Silverberg

[57] ABSTRACT

This invention relates to glass containers with at least one plastic layer on the outer surface of the glass for protection wherein the outer surface of a glass container is coated with a material such as a tin or titanium compound to strengthen the glass. Then the glass is coated with a stearate or polyethylene friction reducing layer. Finally, the heated container is passed through a fluidized bed of plastic powder which adheres and melts on the container to provide the final outer plastic layer. This outer layer may alternatively be sprayed on as a powder by electrostatic means.

5 Claims, No Drawings

GLASS CONTAINER WITH A FIXED PLASTIC PROTECTIVE LAYER

This invention relates to glass containers with at least one layer on the outer surface of the glass for reinforcement and for protection of the glass and is a continuation-in-part of application Ser. No. 261,970, filed June 12, 1972, now abandoned which is a continuation of application Ser. No. 41,623, filed May 28, 1970 now abandoned.

The rising standard of living during recent years has created a considerable increase in the use of containers of various kinds. Glass containers, particularly for beer and soft drinks, because of their low price and general technical appropriateness, have had a corresponding considerable increase in use, both in the form of deposit bottles as well as non-return bottles. Regrettably, it has provided that the economy and technical appropriateness of glass containers can be a disadvantage since people throw away such containers in places other than rubbish cans or corresponding arrangements for the disposal of refuse, and such glass is, accordingly, not subjected to the normal destruction process at refuse destruction plants. Since glass has such good technical properties, which is an advantage from the point of view of use, it is not destroyed by the forces of nature in what can be considered a reasonable period of time. Moreover, if the glass container is shattered, sharp splinters result, which will retain their sharpness for a considerable time. Even if the number of glass containers which, through carelessness, are disposed of outdoors is exremely small compared with total turnover, it is, of course, of great interest to be able to produce glass containers that eliminate the disadvantages herein mentioned, since there will in all probability, regrettably, always be some careless people who throw away containers particularly when they are expendable.

BACKGROUND

The reason why glass containers with properties other than those hitherto used have not previously been available is that research on containers has always been directed towards achieving technically improved glass, which thus is a disadvantage from the point of view of ecology when glass containers are discarded in places where such disposal should not take place.

Although the primary objective is, of course, to prevent glass containers from being disposed in places other than those intended for refuse, one must accept people for what they are and therefore try to minimize the problems arising from the careless disposal of glass containers.

One of the worst problems is the shattering of the container into a scattered mass of sharp splinters which can cut unsuspecting people.

Another problem with hitherto used containers is the high noise levels generated by the filling lines of the breweries.

THE INVENTION

It is accordingly a general object of the invention to provide a glass container that is at least partially covered with a plastic layer which while being thick enough to retain the pieces of broken glass from the safety point of view and to reduce noise levels when handled, is cheap enough for the mass-production bottles required by the beer and soft drink industries.

SUMMARY OF THE INVENTION

It is, of course, previously known to apply various kinds of plastic coatings on glass containers. It is also known to apply a very thick plastic layer, with thicknesses of up to several millimeters, on bottles of the aerosol type. However, this thick, rigid layer forms a second, outer container to protect the inner glass bottle from being broken. But a sheathing of this kind is not economically practicable to use in the production of cheap bottles.

In general, the invention contemplates providing a cheap, lightweight container which provides good safety against explosion and which also reduces noise levels when handled. Thus in order to minimize the weight while retaining the strength, the glass surfaces of the container are always hardened. Such surfaces, however, are very sensitive to scratching and are protected by a very thin, nearly molecular, layer of polyethylene or polyoxyethylene stearate, which serves as a friction reducing layer protecting the glass surfaces from wear.

In general, the invention contemplates a glass container of surface hardened glass material whose outer surface is at least partially covered with a first layer of organic material which has friction-reducing and material binding properties while the first layer is covered with a flexible layer of plastic having a thickness between 0.04 and 0.6 mm.

More particularly, there is provided a glass container whose sidewall surfaces, at least, have been surface hardened. The surface hardening can be accomplished in several ways. For example, the container can be dipped in molten potassium nitrate. In such case potassium ions replace sodium ions at and near the sidewall surface of the container. Upon cooling, the container surface undergoes a compression which yields a substantial increase in the strength of the container.

Alternatively, the ion exchange can be accomplished by introducing lithium ions from a suitable lithium compound at a temperature close to the softening point of the glass. The addition of lithium oxide to the glass results in a glass with low thermal expansion at the surface of the container or a glass which easily can be crystallized by heat treatment. This layer has a low expansion, and when cooled gives the desired compression, at the same time as good chemical resistance is obtained.

Over the surface hardened region of the container another strengthening layer of tin oxide or titanium dioxide can be applied. These layers can be put on by passing the surface hardened containers through a gas tunnel which has an atmosphere of stannic chloride or isopropylorthotitanate, respectively.

On top of this strengthening layer a thin, nearly molecular, layer of organic material is sprayed on, which has friction-reducing properties. For example, a polyoxyethylene stearate or polyethylene in water suspension can be sprayed on the container. When the water evaporates a thin molecular layer of stearate or polyethylene remains on the surface.

On top of this friction-reducing layer is a material-binding adhesive layer of, e.g., polyethylene-imine, which is sprayed on.

On top of this material-binding layer is the final plastic layer, which acts to contain glass fragments upon breakage. The outer plastic layer thus strongly adheres to the glass surface by the material-binding layer.

This outer plastic layer can be applied in several ways. For example, a liquid plastic can be applied which subsequently is hardened. Or powdered plastic materials can be applied to heated containers either by electrostatic means or a fluidized bed so that the heat of the container melts the adhering powders to form the outer plastic layer. The plastics which can be used are either thermoplastic or thermosetting and can include polyethylene, polyvinyl chloride, polyester, or copolymers such as polyethylenepolyvinyl acetate. Alternatively, monomers such as methyl methacrylate can be applied and polymerized by an ionizing radiation such as ultra-violet light.

This final outer layer is between 0.04 and 0.6 mm thick and preferably between 0.1 and 0.2 mm thick. Practical tests have shown that when the containers made according to the invention are broken the very thin coherent outer plastic layer will, to a great extent, prevent the pieces from scattering.

The outer plastic surface layer should extend at least around the side walls of the container. In certain cases this is sufficient, as the neck and the bottom of a bottle usually have considerably greater strength than the side walls, and in most cases are not broken up when the bottle is broken. However, the plastic layer should extend far enough over these sections of the container so that they are retained when the container is broken. The whole of the container should preferably be covered by the plastic material, which thus, in addition to the sidewalls, also covers the bottom part and extends up to or to the vicinity of the mouth part. The plastic material can also extend up over the mouth part and form a sealing member for contact with a cap or some similar closing device.

It should be obvious that the glass container provided with a plastic layer according to the invention will also be stronger, in that it will at least have greater shock resistance even if the tin or titanate layers are absent. Thus, if desired, the thickness of the glass can be reduced, to provide a lighter weight container. This is of considerable importance from the point of view of transportation economy. A further advantage is that there will be less broken glass when the container is handled, particularly on the filling lines in the breweries, which consequently can be operated with a greater capacity and at considerably lower noise levels.

More particularly, the process of making plastic-coated glass containers according to the invention will now be described in detail. The raw glass containers are made in conventional glass container making machines. The containers are then hardened. The hardening may be accomplished by dipping the containers into molten potassium nitrate as they emerge from the glass container making machines. The exchange of sodium ions then takes place with the potassium ions producing strong tensions in the glass surface after cooling to room temperature.

The hardening is then completed by passing the glass containers at a temperature in the range of 450° to 600° C. through a gas tunnel which has an atmosphere of either stannic chloride to coat the container with a layer of tin oxide or an atmosphere of isopropylorthotitanate to coat the container with a layer of titanium dioxide. The hardening with stannic oxide or titanium dioxide can be done without previous ion-exchange.

After the above-described hardening, the outer glass surface is covered with a thin layer of metal oxide which is extremely sensitive to scratching and, therefore, should be immediately protected. Accordingly, the so-coated glass containers are cooled to approximately 100° C. and sprayed with a polyethylene water suspension at a temperature of approximately 100° C. This smooth layer then serves as a friction reducing layer.

Alternatively, a polyoxyethylene stearate solution may be sprayed on to form the friction-reducing layer.

To serve as adhesion for an outer plastic cover, the containers are sprayed with a primer of preferably polyethylene imine.

Thereafter, the container is reheated to a temperature of 250° C. and lowered into a fluidized bed of micro-fine plastic powder, i.e., a plastic powder having particle sizes between 0.05 and 0.3 mm. The plastic powder is preferably polyethylene, but polyvinyl chloride, polypropylene, polyesters or polyvinyl acetate or copolymers such as polyethylene-polyvinyl acetate. The grains of the plastic powder adhere to the glass container and melt. The thickness of this plastic layer can be controlled by controllling the temperature of the glass container and the time the container stays in the fluidized bed. For example, to obtain a layer of polyethylene, with a thickness of 0.10–0.15 mm with the container at approximately 250° C., the container should be in the bed for 1.5 seconds with the polyethylene plastic powder in the bed at a temperature of 40°–50° C.

It should be noted that the container temperature should not be chosen so high as to carbonize whatever plastic powder is used for the coating. For polyethylene, a temperature of 250° C. is preferred. In addition, the thickness of the layer can also be controlled by varying the temperature of the plastic powder in the fluidized bed. For polyethylene, this temperature is generally in the range of 15° C., but should not exceed 75° C.

During the time in the fluidized bed, a certain amount of heat is lost by the container, and the surface obtained on the plastic material is rough, because of unmelted or partially melted plastic powder. Therefore, the container is heated again to a temperature of approximately 250°, at which temperature the plastic material flows and is melted into a coherent layer. Thereafter, the glass container is cooled and possibly inspected once again, and can be prepared for decoration by being subjected to so-called flame treatment.

It is obvious that a plurality of variations and modifications are possible within the scope of the invention, and it should then be noted that although the specification and claims essentially refer only to the coating of the external sides of a container, the corresponding steps, to the extent applicable, can also be applied internally in the container.

While the invention has been described in detail with respect to a certain new preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A plastic-coated glass container comprising a glass container with bottom, sidewall and neck portions having at least its sidewall surface surface-hardened, an outer layer of plastic hardened on to said glass container and having a thickness of between 0.04 and 0.06 mm, and an intermediate molecular layer of friction reducing organic material between said surface-hardened sidewall surface and said outer layer of plastic and wherein said outer layer of plastic is from the group consisting of polyethylene, polypropylene, polyvinyl chloride and polyester or copolymers thereof.

2. The plastic-coated glass container of claim 1 wherein said outer layer of plastic is a copolymer.

3. The plastic-coated glass container of claim 2 wherein said outer layer of plastic is a copolymer of ethylene and vinyl monomers.

4. The plastic-coated glass container of claim 1 wherein said outer layer of plastic is methyl methacrylate.

5. The plastic-coated glass container of claim 1 wherein said outer layer is fixed by a material-binding adhesive layer of polyethylene imine.

* * * * *